United States Patent
Gibson

(10) Patent No.: US 7,082,095 B2
(45) Date of Patent: Jul. 25, 2006

(54) SYSTEM AND METHOD FOR STORING DATA

(75) Inventor: Gary A. Gibson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/267,073

(22) Filed: Nov. 3, 2005

(65) Prior Publication Data

US 2006/0062126 A1    Mar. 23, 2006

Related U.S. Application Data

(63) Continuation-in-part of application No. 10/000,404, filed on Oct. 31, 2001, now Pat. No. 6,975,575, which is a continuation-in-part of application No. 09/865,940, filed on May 25, 2001, now Pat. No. 6,970,413.

(51) Int. Cl.
    *G11B 9/00* (2006.01)
(52) U.S. Cl. ..................................... 369/126
(58) Field of Classification Search ................. 369/126
    See application file for complete search history.

(56) References Cited

U.S. PATENT DOCUMENTS

| | | | |
|---|---|---|---|
| 4,213,192 A | | 7/1980 | Christensen, Sr. |
| 5,270,995 A | | 12/1993 | Wada et al. |
| 5,557,596 A | | 9/1996 | Gibson et al. |
| 5,615,143 A | | 3/1997 | MacDonald et al. |
| 5,675,532 A | | 10/1997 | Gemma et al. |
| 5,808,973 A | | 9/1998 | Tanaka |
| 5,986,381 A | | 11/1999 | Hoen et al. |
| 6,046,972 A | | 4/2000 | Kuroda et al. |
| 6,101,164 A | * | 8/2000 | Kado et al. ................. 369/126 |
| 6,156,215 A | | 12/2000 | Shimada et al. |
| 6,185,051 B1 | | 2/2001 | Chen et al. |
| 6,197,399 B1 | | 3/2001 | Naito et al. |
| 6,215,114 B1 | | 4/2001 | Yagi et al. |
| 6,275,410 B1 | | 8/2001 | Morford |
| 6,473,388 B1 | * | 10/2002 | Gibson ....................... 369/126 |
| 6,643,248 B1 | * | 11/2003 | Naberhuis et al. .......... 369/126 |

(Continued)

FOREIGN PATENT DOCUMENTS

EP          0363147       4/1990

(Continued)

OTHER PUBLICATIONS

Apertureless near-field optical microscope (Abstract) F. Zenhausern, M. P. O'Boyle, and H. K. Wickramasinghe.

(Continued)

*Primary Examiner*—Thang V. Tran

(57) ABSTRACT

A data storage unit is disclosed. The data storage unit can comprise a data storage layer having a plurality of data storage areas. Each data storage area can be configured to carry at least one bit of data. An electron beam emitter can be configured to selectively direct a beam of electrons toward the data storage layer to enable one or more of the data storage areas to be read. The data storage layer can further be configured to filter the beam of electrons directed toward the data storage layer according to a state of the data storage area. The data storage unit further comprises a layer adjacent to the data storage layer (LASL) in which carriers are generated in response to the number of electrons reaching the LASL. A detection region can be in carrier communication with the LASL and configured to measure carrier transport in the detection region to determine the state of the storage area.

27 Claims, 4 Drawing Sheets

U.S. PATENT DOCUMENTS 6,700,853 B1 * 3/2004 Raese .................. 369/126
6,735,163 B1   5/2004 Marshall
6,738,336 B1 * 5/2004 Naberhuis ............ 369/126

FOREIGN PATENT DOCUMENTS

| EP | 1187123 | 8/2000 |
|---|---|---|
| EP | 1091355 | 4/2001 |
| EP | 1239469 | 3/2002 |
| EP | 1211680 | 6/2002 |
| WO | WO9963536 | 12/1999 |

OTHER PUBLICATIONS

Apertureless near-field optical microscope (Abstract) F. Zenhausern, M. P. O'Boyle, and H. K. Wickramasinghe.

* cited by examiner

SYSTEM AND METHOD FOR STORING DATA

CROSS-REFERENCE TO RELATED APPLICATIONS AND CLAIM OF PRIORITY

This is a continuation-in-part of U.S. patent application Ser. No. 10/000,404 filed on Oct. 31, 2001 now U.S. Pat. No. 6,975,576 which is a continuation-in-part of application Ser. No. 09/865,940 filed May 25, 2001 now U.S. Pat. No. 6,970,413.

BACKGROUND

Electronic devices, such as palm computers, digital cameras and cellular telephones, are becoming more compact and miniature, even as they incorporate more sophisticated data processing and storage circuitry. Moreover, types of digital communication other than text are becoming much more common, such as video, audio and graphics, often using massive amounts of data to convey the complex information inherent therein. These developments have created an enormous demand for new storage technologies that are capable of handling enormous amounts of data at a lower cost and in a much more compact package.

There is a continued need for increased miniaturization and expanded ability to handle greater quantities of data at a faster speed and in even more compact areas. The industry is moving towards the storage of data having a cell size in the range of tens to hundreds of nanometers.

In some storage devices, such as CD-RW and DVD-RW drives, data is written and/or detected using directed light beams, such as lasers, to reversibly change the optical reflectivity of a storage medium. As data storage densities and miniaturization increase, the diffraction-limited spot size of the lasers sets a lower bound to the size of bits to be written. Thus, optical storage is limited by the wavelength of the directed light beam.

The storage of data at substantially increased densities gives rise to problems in the task of reading the data. High-density storage devices make sensing data increasingly difficult because of interference from neighboring non-selected memory cells and because the flows of electrons, photons or holes generated from the sensing process are so small that detection becomes extremely difficult and errors in data detection increase.

Accordingly, to read miniature data cells in high-density memory storage, it is desirable to develop techniques capable of producing greater amounts of carrier flows and more effective methods of converting energy from probe electrons to detectable carriers. Memory structures and methods are needed to store and read high-density data so that detection of data is more readily obtained.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
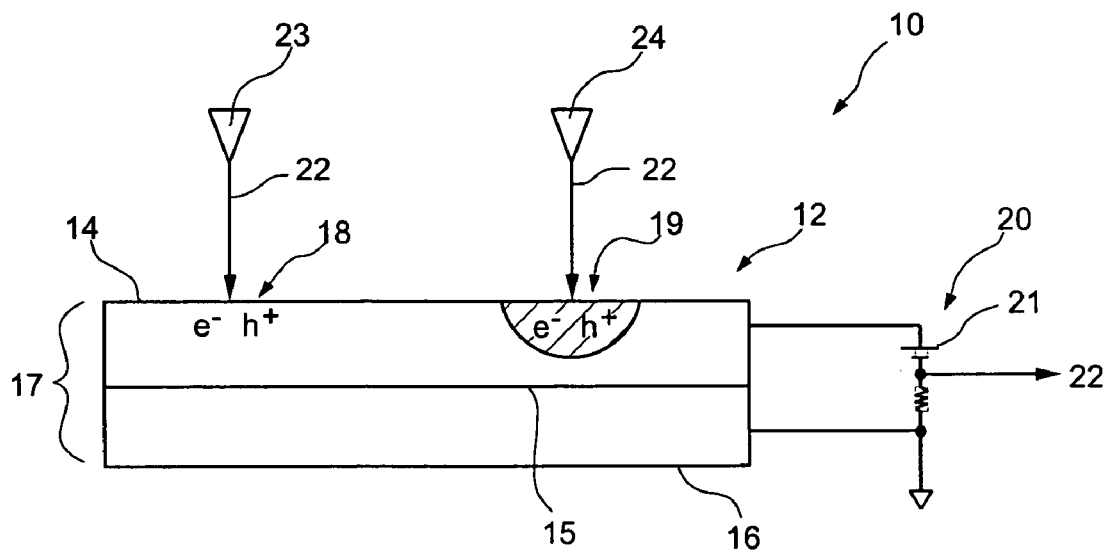
FIG. 1 is a schematic cross-section view of a data storage device utilizing a semiconductor diode junction for detecting the state of a sensed data storage area in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

The present invention provides high-density memory storage utilizing directed electron beams to read data in the memory storage by generating a flow of carriers. This includes enhancing structure and methods for affecting the carrier transport to improve the sensing and detection of data while minimizing error. "Carriers" as used herein refers to electrons, holes and/or photons that are generated by the impact of electrons on semiconductor materials in one of the layers described herein. "Carrier transport" as used herein refers to the movement or flow of carriers through a medium. The enhancing structure is a layer adjacent the storage layer (LASL) that contributes to or affects the carrier transport at a detection point to improve detection and lower the possibility of error.

In one embodiment, a data storage unit comprises a data storage layer having a plurality of data storage areas for reading data thereon during the read phase. An array of beam emitters are disposed in close proximity to the data storage layer to selectively direct an electron beam to a selected data storage area to read data stored therein. A medium is disposed on the data storage areas that can be changed between a plurality of states by a first electron beam during a write cycle. Writing can be accomplished by altering the structure or composition of the medium.

The structure or composition of the medium can be altered in such a way as to vary its secondary electron emission coefficient (SEEC), its backscattered electron coefficient (BEC), or the collection efficiency for secondary or backscattered electrons emanating from the selected data storage area. The SEEC can be defined as the number of secondary electrons generated from the medium for each electron incident onto the surface of the medium. The BEC is defined as the fraction of the incident electrons that are scattered back from the medium with an energy greater than 50 eV. The collection efficiency for secondary/backscattered electrons is the fraction of the secondary/backscattered electrons that are collected by an electron collector, typically registered in the form of a current.

The plurality of states exhibit substantial differences in their responses to electron beams during a read phase. This difference may relate to (1) the nature of electron absorption and/or reflection of the medium in its different states, (2) the capability of the states for carrier generation or recombination and/or (3) the impact of the states on local electric fields that, in turn, influence the generation and recombination of carriers.

In one embodiment, the data storage layer is comprised of a material whose structural state can be changed from crystalline to amorphous by electron beams. The amorphous state has a different SEEC and/or BEC than the crystalline state; this leads to a different number of secondary and/or backscattered electrons emitted from the storage area. By measuring the number of secondary and backscattered electrons, the state of the storage area can be determined. To change from the amorphous to crystalline state, the beam power density can be increased and then slowly decreased. This heats up the amorphous area and then slowly cools it so that the area has time to anneal into its crystalline state. To change from crystalline to amorphous state, the beam power density can be increased to a high level that results in melting and then rapidly decreased in beam power so as to quench the melt. To read from the storage medium, a lower-energy beam strikes the storage area.

For directed electron beams, suitable materials for providing contrast between different states of the materials with regard to the activity of electron-hole carrier pairs for the three media types described herein would include various chalcogen-based compounds. An example of such type of material is indium selenide (InSe) and ternary alloys based on InSe.

A layer adjacent to the data storage layer (LASL) is provided for generating or affecting the flow (transport) of carriers during the read phase. In addition the LASL may improve the electrical, optical or thermal properties of the device stack, either through its own electrical or thermal properties, or by improving the properties of the storage layer. The carrier generation and transport in the LASL may be the result of direct impact of electron beams from the beam emitters, carrier transport from the data storage layer, and/or an electric field impressed on the LASL or the storage layer. A detection region in communication with the data storage areas or with the LASL is provided for determining the activity of the electron-hole pairs during the read phase, the activity of the electron-hole pairs being relative to the state of each storage areas. A detector senses the electron-hole pair activity in the detection region to determine the state of each storage area.

As used herein, the term "states" is meant to include different crystalline phases and the amorphous state. States can also include variations in chemical composition or morphology, as well as changes in the density, location, or nature of trapped charges. States can also include the density and type of defects that affect the relevant electrical properties. In one or more of the embodiments, the LASL has a characteristic of responding to a directed read beam by generating some type of carrier flow or transport that can be detected to determine the state of the storage area being sensed.

As discussed below, electron beams are directed to a LASL, either indirectly through the storage layer if the LASL is beneath the storage layer, or directly if the LASL is on top of the storage layer. In the first case, the electron beam is partially filtered by one or more storage areas in a storage layer. As used herein, "filtered" means a variation in the SEEC or BEC, or the penetration depth of the electrons in the storage areas. Electron-hole carrier activity is generated in the LASL in proportion to the number and energy of electrons reaching the LASL through a storage area in at least one of the states when impacted by a directed electron beam. This electron-hole carrier pair activity can be modulated by the number of carriers that are initially generated by the electron beam.

Using an electron beam to read and write the data storage areas has several advantages over the use of an optical beam. First, an electron beam can be used to form smaller data storage areas. When using an optical beam, the size of each data storage area is limited by the wavelength of the light due to diffraction of the light waves and other characteristics of electromagnetic waves. Focusing an electron beam to, for example, an area with a diameter half that attainable with an optical beam can enable data storage areas having one fourth the area that the optical beam is capable of creating. This allows up to four times more data to be stored within the same area. Second, each excited electron in an electron beam can generate multiple electron hole pairs. This enables a read signal using an electron beam in the data storage unit to be amplified in comparison with a read signal using an optical beam.

With reference to FIG. 1, background disclosure is provided for understanding the present invention. A data storage system 10 includes a memory storage unit 12 having at least two layers 14, 16. Layer 14 is a data storage layer having multiple data storage areas 18, 19. Layers 14 and 16 form a diode 17 having a junction 15 across which electron and/or hole carriers flow. The diode can be any type that provides a built-in field for separating charge carriers, such as an n–n' or p–p' iso-type junction, a p–n or n–p hetero-type junction (with layers based on the same (homotype) or different (heterotype) materials), or a Schottky barrier device, depending on the materials used. The storage areas can be written and read by using electron beams from electron beam emitters 23 and 24. The electron beam emitters can can include field emitters, Schottky emitters, thermionic emitters, or any other type of electron beam emitter. A detection circuit 20 is connected across junction 15 showing one way to sense the carrier transport indicating the data stored in the storage areas.

In one example, a data bit is written by locally altering the state at area 19 of the storage layer 14 with the use of a directed electron beam 22 from field emitting unit 24. Another storage area 18 may be impacted by a similar field emitting unit 23 in another read cycle. As shown, storage area 18 is in one state and storage area 19 has been changed to another state. The different states of the storage areas 18 and 19 can provide a contrast in bit detection during the read function.

The storage layer 14 may comprise a phase-change material similar to those typically used in optical recording. These materials can be reversibly changed from crystalline to amorphous by applying heat at a pre-determined temperature profile over a pre-selected time period. The state may be changed from crystalline to amorphous by heating the area with a high intensity electron beam, sufficient to melt the phase-change material, and then quickly decreasing the intensity of the beam to quench the area. Quenching a phase-change material causes it to cool rapidly into an amorphous state without time to anneal. The state of the storage area may be changed from amorphous to crystalline by using an electron beam to heat the phase-change material just enough to anneal it. Alternatively, the materials may be changed from one crystalline state to another crystalline state using different temperatures for different time periods. Other sources of energy, such as a resistive heater or applied electric or magnetic field may be used to bias a large area of the storage layer 14 to aid the electron beams 22 in locally affecting a phase change in the storage areas 18 and 19.

During the read function, the electron beam emitters 23 and 24 preferably emit a lower level energy field than during the write cycle, but still of sufficient energy to locally excite charge carriers in the storage areas 18, 19. If carriers are excited in the storage layer 14, the number of carriers created (the "generation efficiency") will depend on the state of the storage areas 18, 19 where the electron beams 22 are incident. A factor that affects generation efficiency is the band structure of the storage layer. Some fraction of the generated carriers of one sign (electrons or holes) will be swept across the diode interface (the "collection efficiency) under the influence of a built-in field. The collection efficiency is dependent upon, among other things, the recombination rate and mobility in and around the area on which the read photons are incident and the effect of the built-in fields. An additional field may be applied across detection circuit 20 by a voltage source 21. The current that results from carriers passing across the diode interface 15 can be monitored by a detection signal 22 taken across the interface junction 15 to determine the state of data storage areas 45. Alternatively, the diode can be operated "open circuit" without current flowing across the junction and the open-circuit voltage developed across the diode can be monitored.

Thus, variations in the current generated across the diode 17 by the read photons can depend on both the local generation efficiency and the local collection efficiency. Both of these factors are influenced by the state of the region upon which the photons are incident. The phase-change material of storage layer 14 can be comprised of a number of phase change materials with the appropriate electrical properties (bandgap, mobility, carrier lifetime, carrier density, etc.) including a number of chalcogenide-based materials and other phase-change materials.

Layer Adjacent the Storage Layer

Figure 2:
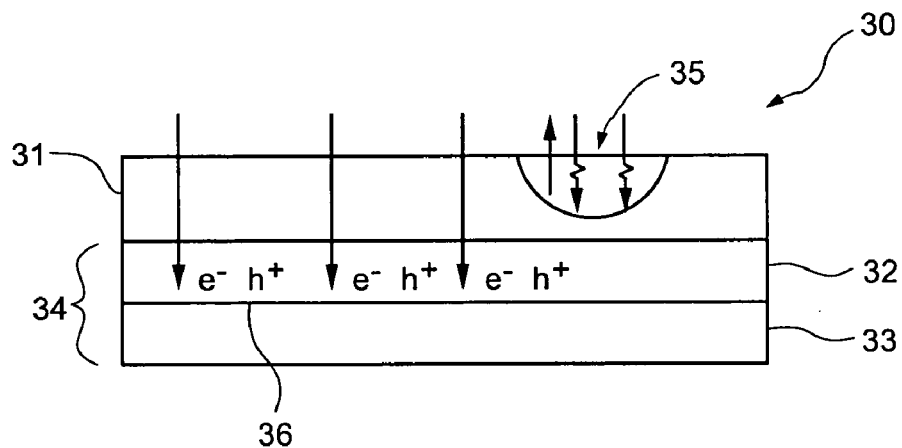
FIG. 2 is a schematic cross-section view illustrating the LASL principle of the present invention with an adjacent layer structure below the storage layer in accordance with an embodiment of the present invention.
Figure 3:
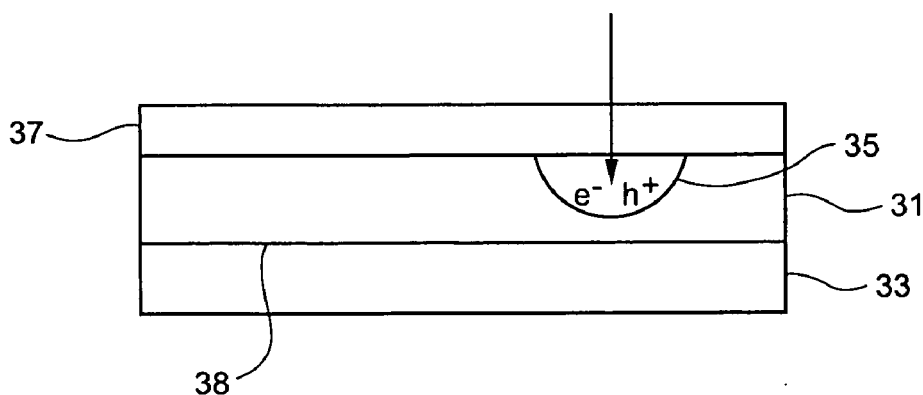
FIG. 3 is a schematic cross-section view illustrating the LASL principle of the present invention with an adjacent layer structure above the storage layer in accordance with an embodiment of the present invention.

FIGS. 2 and 3 illustrate the principle of the LASL in two different implementations within the environment shown in FIG. 1. An additional layer is provided adjacent to the storage layer (LASL) for the purpose of generating carriers and/or affecting the location and efficiency of generation of carriers by the electron beams during the read mode and/or the flow of these carriers after generation. This concept may be applied in a variety of different devices for sensing carrier transport, including but not limited to a semiconductor diode, a cathodoconductive region and a cathodoluminescent region, as further described herein.

A diode configuration 30 is shown in FIG. 2, in which an adjacent layer 32 is disposed directly below a storage layer 31. In this position the adjacent layer 32 forms a diode having a junction 36 across which the carrier transport is detected. In this arrangement, the storage layer 31 and the LASL 32 may interact in several ways.

In one application, the LASL 32 is used as the primary generator of carriers and the storage layer acts as a variable absorber and/or reflector of the beam. In this approach a different amount of electrons will reach the LASL 32 depending on the state of each portion of the storage layer 31. These differences occur because the penetration depth of the incoming electrons can depend on the state of the storage layer, as can the number of secondary and/or backscattered electrons. Thus, the generation of carriers in the LASL 32 beneath storage area 35 will vary, depending on the presence or absence of a bit in the storage area 35.

One advantage of this approach is that the functions of data storage and data detection are separated, so that the best type of materials for each function can be selected. Thus, the material used for the storage layer 31 will be selected based primarily on its capability to change states in the desired manner to store data, and the contrast between the states in the degree to which electrons are absorbed or scattered. The storage layer 31 does not need to have the electrical properties necessary for forming a good diode junction with layer 33. In contrast, the material used for the LASL 32 will be selected based primarily on its capability to generate carriers and to form a junction with layer 33 with a high collection efficiency for carriers generated in the LASL 32.

In another application for the structure shown in FIG. 2, the storage layer 31 is arranged or selected so that it has an effect on the carriers collected at the diode interface between LASL 32 and diode layer 33. (32/33 interface). In this arrangement, carriers can be generated in either layer 31 or layer 32 and the number of carriers reaching the 32/33 interface detection area is primarily influenced by the type and degree of interactions between the storage layer 31 and the LASL 32.

More specifically, the state of the storage layer 31 may affect the fraction of carriers generated in the storage layer 31 or LASL 32 that are collected at the 32/33 diode interface by affecting (1) the mobility of carriers generated in the storage layer 31, and/or (2) the local recombination rate of electron-hole pairs in either the storage layer 31 or LASL 32 or the 31/32 storage layer/LASL interface, and/or (3) the local electric fields (built-in and applied) in the storage layer 31 and LASL 32 and, thereby, the motion of the generated carriers. The 31/32 interface does not need to have low leakage currents and may form a rectifying junction or an ohmic contact. In either case, it should not impede carriers and should have a low recombination rate for the types of carriers that are detected at the 32/33 diode interface.

There are several ways that the LASL 32 can help in this arrangement. One way is by forming a better junction or interface with the bottom layer 33 (32/33 diode interface) than would be formed by storage layer 31. The 32/33 diode interface is improved in that there is more efficient collection of the generated carriers and/or less leakage current in the absence of the read beam. The collection efficiency is improved by the 32/33 diode interface being formed such that there are no problematic band-offsets or unwanted interface states that cause recombination or charge trapping, all of which can impede carrier collection.

In some cases, it may be difficult to find a phase-change material for the storage layer 31 that forms a good junction with another layer 33 and does not have collection efficiency or leakage problems. Thus, in the embodiments where the LASL 32 does not form a rectifying junction with the storage layer 31, the LASL 32 can help by separating out the functions of storage, which requires material properties that allow phase-changing, from the material properties required for the formation of low-leakage diode junctions with high carrier collection efficiency. Adding the LASL 32 divides these material requirements between two layers so that each layer can be selected for optimum performance of the required functions.

On the other hand, the new interface between the storage layer 31 and the LASL 32 and the extra transport required across the LASL 32 can also be considered. The carriers generated in the storage layer 31 must make it across the LASL 32 to be collected by the 32/33 interface or junction.

This means that either the diffusion length for the carriers in the LASL 32 must be long compared to the LASL thickness, or a strong field must be applied such that the mean free path length before recombination, or schubweg, of the carriers is long compared to the LASL thickness.

When the LASL 32 is placed on top of the storage layer 31, the LASL can be formed thin enough such that a substantial portion of the electrons can penetrate the LASL when electrons are accelerated to a reasonable velocity. The LASL 32 may also be used to generate an amplification or multiplication of carriers. In that case a field is applied across the LASL 32 that is strong enough to cause impact ionization and an avalanche effect in the LASL. Note, however, that this may be difficult to do without applying a field to the other layers that will cause distortion or other undesirable effects.

In an additional embodiment, carriers can be generated in either the LASL 32 or storage layer 31. The phase state of the storage area 35 can affect the electric field of the LASL 32 and thereby influence the number of carriers crossing the LASL 32/layer 33 diode interface to produce a signal. Any of the arrangements indicated above, or a combination of these effects can facilitate detection of the carriers in the detection area and should substantially reduce the possibility of bit-detection error.

As shown in FIG. 3, an adjacent layer 37 may be disposed above the storage layer 31. It should be noted that one or more of the embodiments described can be inverted, with the electron beam located below the layers described. Thus, the terms above and below can be used interchangeably when describing the ordering of the layers, depending upon the location of the electron beam. In this embodiment, an electron beam can first impact the adjacent layer 37 before reaching the storage area 35 in storage layer 31. The storage layer 31 can form part of the diode structure with layer 33, so that carrier flow across junction 38 between layers 31 and 33 indicates the state of area 35. The LASL may be made of a cathodoluminescent material that acts as a transformer, changing the electron beam to light waves having a wavelength that is more compatible for the storage layer to generate carrier activity. Alternatively, this structural arrangement may be applied for the LASL 37 to be used as a protective layer, an anti-reflective coating or a conductive layer, in the event that a field is applied. For better understanding of the invention, an embodiment is shown using a diode junction similar to that shown above and described below for establishing carrier flow for detecting the state of a storage area. Three alternate embodiments are described, also using a LASL arrangement in the context of a cathodoconductive device and a cathodoluminescent device.

Diode Junction with LASL Layer

Figure 4:
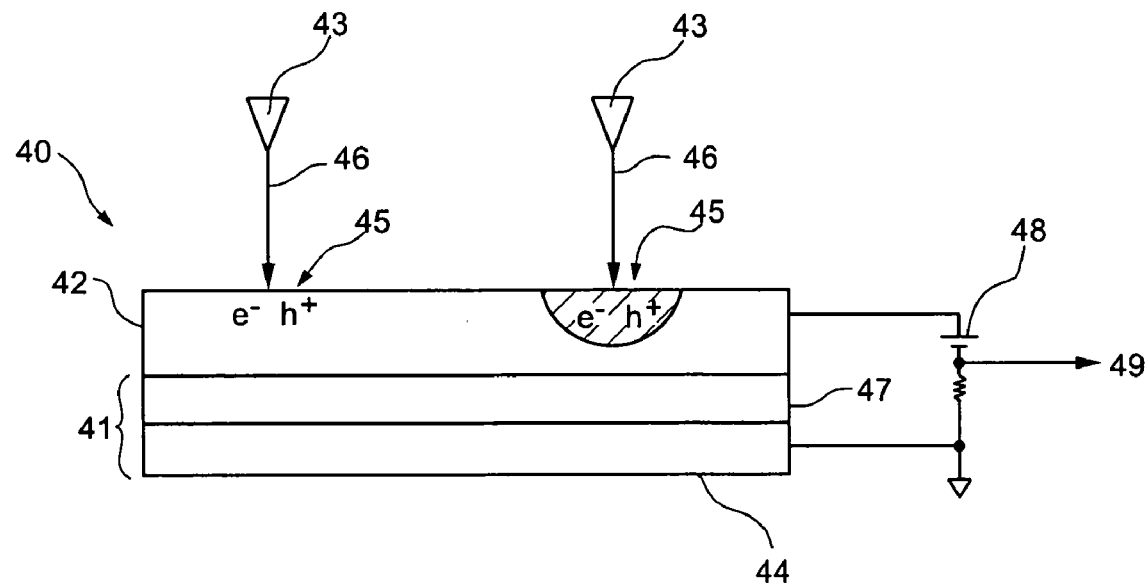
FIG. 4 is a schematic cross-section view of a data storage device utilizing a semiconductor diode junction and a LASL arrangement in accordance with an embodiment of the present invention in accordance with an embodiment of the present invention.

Looking now at FIG. 4, one embodiment of the present invention is shown. A data storage system 40 utilizes a semiconductor diode 41 for sensing the electron-hole carrier flow in response to a reading beam in a selected storage area. Field emitting devices 43, are disposed above a data storage layer 42 that comprises one layer of the diode 41. A LASL layer 47 is disposed beneath storage layer 42 and together with layer 44 forms the diode 41.

A data bit is written by locally altering the state at area 45 of the storage layer 42 with the use of field emitting unit 43 emitting one or more electron beams 46 on storage area 45 in storage layer 42. The different states of the storage area 45 can provide a contrast in bit detection during the read function. Other sources of energy, such as a resistive heater or applied electric or magnetic field may be used to bias a large area of the storage layer 42 to aid the electron beams 46 in locally affecting a change of state in the storage areas 45.

During the read function, the electron beam emitters 43 emit a lower level energy field (electron beam) to locally excite charge carriers in the LASL layer 47 of the diode 41, as discussed with respect to FIG. 2. The amount of the beams that reaches the LASL layer 47 will depend on the state of the storage areas 45. Thus the storage layer acts primarily as a variable absorber or reflector of the beam during the read stage, depending on the state of the storage areas. An additional field may be applied across interface 44/47 by a voltage source 48. The current that results from carriers passing across the diode interface 44/47 can be monitored by a detection signal at a detector 49 taken across the interface 44/47 to determine the state of data storage areas 45. Alternatively, the open circuit cathodo-voltage generated across diode 41 could be monitored.

Thus, variations in the current generated across the diode 41 by the read electrons depend on the local generation efficiency and the local collection efficiency of the junction/LASL structure as influenced by the LASL. Both of these factors are influenced by the state of the region upon which the photons are incident.

Cathodoconductive LASL

Figure 5:
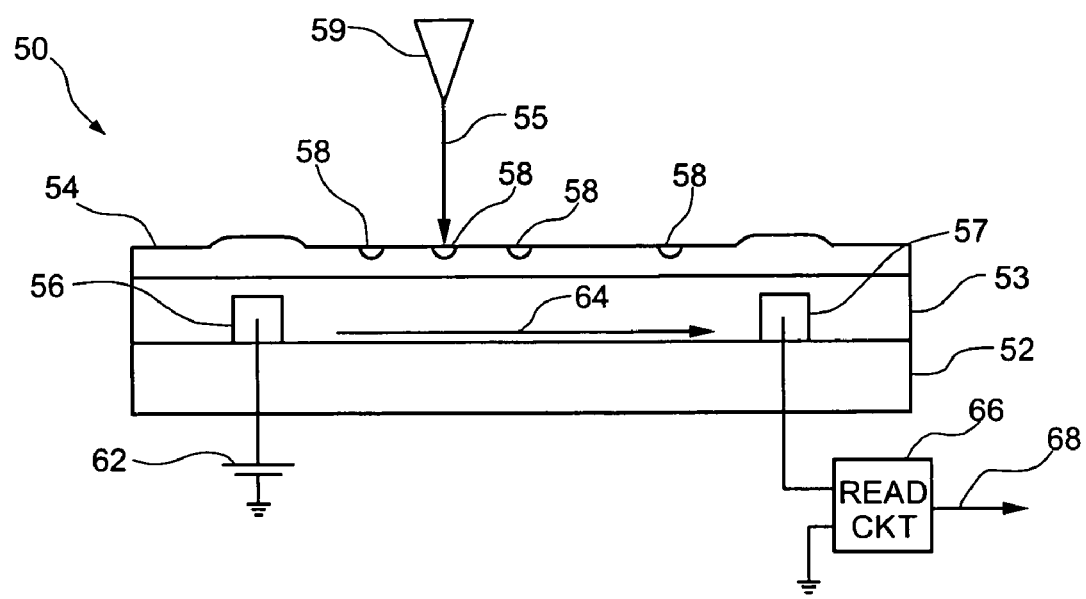
FIG. 5 is a schematic cross-section view of a data storage device utilizing a cathodoconductivity region and a LASL arrangement in accordance with another embodiment of the present invention in accordance with an embodiment of the present invention.

With reference to FIG. 5, another structure is depicted in which cathodoconductivity is utilized for the detection of recorded bits. Storage device 50 includes an electrically insulating substrate 52 and a storage layer 54. The substrate 52 may be made of silicon having an oxidized top layer. The storage layer 54 has a plurality of data storage areas 58 to be sensed by electron beam 55 directed from an electron beam emitter 59. A cathodoconductive LASL layer 53 is disposed beneath the storage layer 54 for detecting the number of electrons that make it through the storage layer, which in turn is dependent on the state of the storage areas 58. The cathodoconductive layer 53 may include a single layer of cathodoconductive material or multiple layers of different cathodoconductive materials.

A plurality of spaced apart electrodes, such as electrode pair 56 and 57, make contact with the LASL layer 53, which may be deposited over or under electrodes 56 and 57. The data storage region containing a plurality of data storage areas 58 is located between electrodes 56 and 57, as shown in FIG. 5. The storage areas may be arranged in rows and columns, with the state of each area being determinative of the data stored therein. In one embodiment, the storage areas are of sub-micron size, approximately 10 nanometers to 30 nanometers in diameter and spaced about 50 nanometers apart.

An array of electron beam emitters 59 can be disposed above the storage layer 54 to provide directed beams of electrons, as previously discussed. The directed beam 55 can have appropriate time and power parameters to change the state of the storage areas 58 between amorphous and crystalline states or between different crystalline states, as discussed above. Micro-movers may be used to scan the array of electron beam emitters over the storage areas 58.

A power supply 62 can apply a bias voltage across the electrodes 56 and 57 during the read function. This bias voltage can induce an electric field 64 in the plane of the cathodoconductive layer 53. The power supply may be fabricated on the substrate 52 or may be provided outside the chip.

During read operations on the storage areas 58, electron beam emitter 59 can be scanned between electrodes 56 and 57 while the bias voltage is applied to the electrodes. When the electron beam 55 impacts the cathodoconductive layer 53, electron carriers and hole carriers are produced and accelerated by the electric field 64 towards electrodes 56 and 57. This movement of electrons and holes causes a current to flow, which is detected by a read circuit 66 to provide an output signal 68. The number of electrons from the electron beam emitter that make it to the cathodoconductive LASL 53 is influenced by the state of the overlying storage layer 54. The change in the state of the storage layer can impact the number of electrons reaching the cathodoconductive LASL 53 by changes in absorption of energy of the read beam electrons and/or reflection of the read beam electrons and/or the number of secondary electrons ejected from the storage medium.

The LASL layer 53 is preferably made of a material that is a good cathodoconductor. Thus the result should be an improvement in the detection of carriers by read circuit 66 and minimizing error in the output signal 68 indicating the state of the storage area interrogated by the emitter 59. In this embodiment, the LASL again enables the separation of functions to improve performance of the memory storage unit. The LASL material is selected primarily for its cathodoconductive response, allowing the desirable thermal, chemical and optical properties of the data storage layer to be engineered separately.

By monitoring the changes in the magnitude of the current, the states of the storage areas 58 can be determined. The output 68 from read circuit 66 may be amplified and converted from analog to a digital value if desired.

Cathodoluminescent LASL

Figure 6:
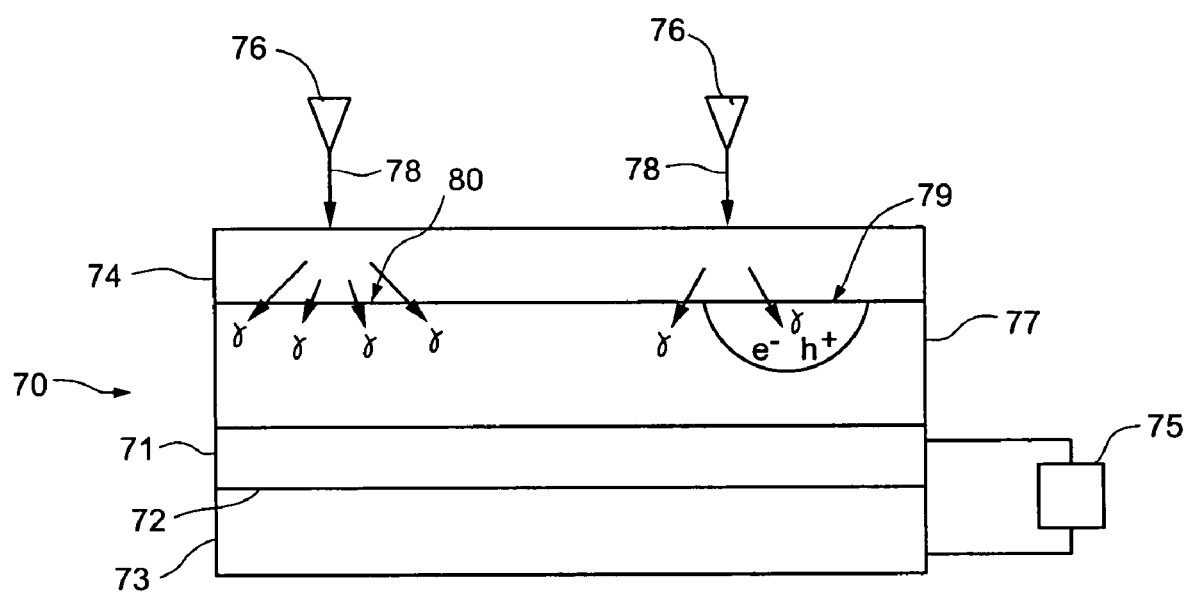
FIG. 6 is a schematic cross-section view of a data storage device utilizing a cathodoluminescent structure and a LASL arrangement in accordance with another embodiment of the present invention.

Referring now to FIG. 6, another storage structure is shown wherein the electron-hole pairs generated during the read process are detected via their radiative recombination. In this arrangement the LASL is a cathodoluminescent material that generates photons in response to read electron beams. The LASL is disposed on top of the storage layer that acts as a filter to variably absorb or scatter the photons depending on the state of the storage areas. A photo-detector, such as a photodiode, photoconductor or micro-fabricated photomultiplier tube may be used for photon detection.

In this embodiment, the LASL 74 again enables the separation of functions to improve performance of the memory storage unit. The LASL material can be selected primarily for its ability to convert electrons generated by the electron beam emitters to light waves having a predetermined wavelength or wavelength range for optimal use by the storage layer 77. The storage layer 77 is selected primarily for its ability to change phases in response to the emission of light from the LASL 74. Thus, one may select an inexpensive, easy to use emitter for the electron beam and a phase change material that provides excellent contrast in light absorption and reflection between written and unwritten states. The LASL provides the match by receiving electrons from the emitter and generating light at a predetermined wavelength to accommodate the demands of the storage material.

As shown in FIG. 6, a cathodoluminescent LASL 74 is deposited on the surface of the storage unit 70. Electron beam emitters 76 are disposed near the surface of cathodoluminescent LASL 74 to direct electron beams 78 onto the surface. A storage layer 77 is disposed beneath LASL 74 and above a photodiode structure made up of layers 71 and 73 or some other type of photodetector.

Data is stored in the storage layer 77 by applying the electron beams 78 in selected storage areas 79 to alter the light absorbing or reflecting properties of the storage layer. The storage layer material can, for example, be any one of a number of chalcogenide-based phase-change materials. The photon absorbing or scattering properties of the storage layer 77 may be altered in a number of different ways, such as by changing the electronic band structure and/or introducing defects that affect the absorption properties. The LASL 74 can be made of material that is sufficient to withstand high temperatures during the writing phase to the underlying storage layer 77.

During the read mode, the electron beams 78 can have a lower power intensity to prevent undesired writing. The written storage areas 79 can absorb and/or reflect a different number of photons than the unwritten areas 80 on the storage layer 77 that have not been written. The photons that pass through the storage layer can generate a current of electron and hole carriers in the photodiode. A meter 75 connected between the layers of photodiode 70 can measure the current or voltage across the photodiode interface 72 as each storage area is impacted by an electron beam to determine the state of each sensed storage area. It is understood that layer 71 is used here to form a layer of the photodiode, so that the LASL layer does not need to provide that function. Layer 71 may be eliminated if storage layer 77 is fabricated of suitable materials to accommodate the photodiode function.

For the "cathodoluminescent LASL" embodiment, further explanation is in order. It should be noted that, in both examples discussed herein, the storage layer can be used as a variable absorber and/or reflector. The difference between this embodiment and the first embodiment described above is primarily a difference in how the state of the storage layer is detected. In the first case, the number of electrons making it through to a detector, such as a diode, determines the state of the storage layer. In the cathodoluminescent LASL case, electrons from the read beam are absorbed in the top, cathodoluminescent LASL and converted to photons. The photons then generate electron-hole pairs in the underlying diode (or other type of detector). The state of the storage layer (i.e. crystalline or amorphous) determines whether the photons make it through the storage layer to a detector, such as a photodetector.

There are several reasons for converting electrons to light of a predetermined wavelength or wavelength range. One reason is that phase change material may provide more contrast in the absorption between amorphous and crystalline stages using light of a predetermined wavelength, thereby improving signal contrast. The luminescent LASL may be used to convert the emitters' electron beam to a light wavelength or range of wavelengths that is better suited to a predetermined phase-change material. Another reason for conversion is to produce light at a wavelength or wavelength range that better matches the range of highest sensitivity of an inexpensive, easy to produce photodetector.

Another reason for wavelength conversion is to incorporate a luminescent LASL, or several LASL layers that luminescence at different wavelengths, to produce light at multiple wavelengths with a single, inexpensive, easy to manufacture electron beam emitter that can be used to access bits in multiple phase-change storage layers (with each storage layer matched to a different wavelength range).

Another alternative embodiment to the foregoing structure is to place the storage layer above the LASL and use the storage layer to filter the amount of electrons that reach the luminescent LASL. Detection of photons emitted from the LASL can be accomplished by an appropriate photodetector.

LASL Method

Figure 7:
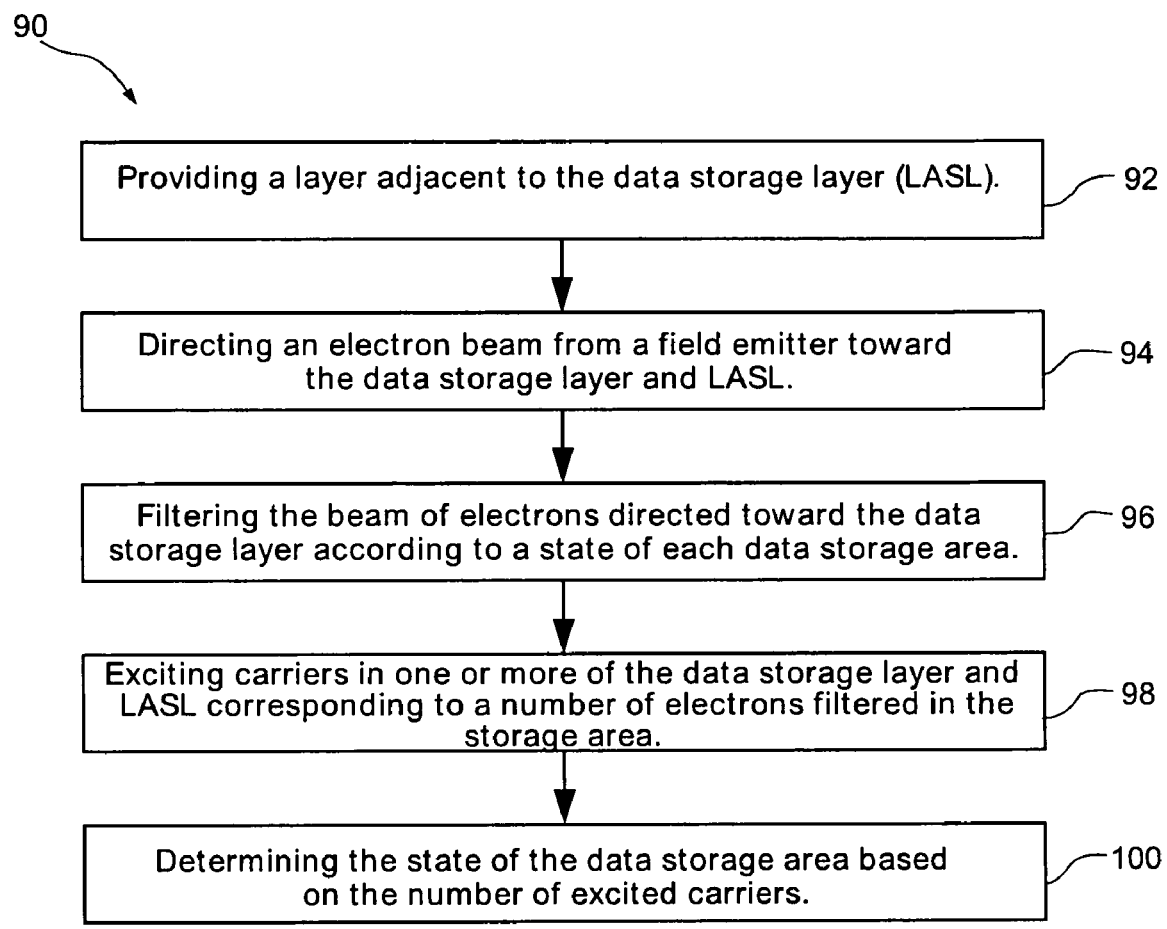
FIG. 7 is a flow diagram illustrating a method of one embodiment of the present invention.

In another embodiment, a method 90 for storing data in a data storage unit including a data storage layer having a data storage area is shown in the flowchart of FIG. 7. The method includes the operation of providing a layer adjacent to the storage layer, as shown in block 92. A further operation includes directing an electron beam from an electron beam emitter toward the data storage layer and LASL, as shown in block 94. Another operation involves filtering a portion of the electrons from the electron beam incident on the data storage layer by a selective amount, wherein the filtering is dependant on a state of the data storage area, as shown in block 96. The state of the data storage area may be binary, having two states that can represent a digital 1 or 0. For example, the binary state may be formed by altering the data storage layer to form a crystalline or amorphous data storage area, as previously disclosed. Alternatively, the data storage layer may have a plurality of states that can be used to store data.

A further operation includes exciting carriers in one or more of the data storage layer and LASL layer corresponding to a number of electrons filtered in the storage area, as shown in block 98. The electron beam incident on the storage area can excite carriers in the data storage layer and/or LASL layer. The number of excited carriers can be dependent upon the state of the data storage area. Another operation involves determining the state of the data storage area based on the number of excited carriers, as shown in block 100. For example, fewer carriers may be excited when the storage area is in one state as compared to the other. It can be determined which state the carrier is in by measuring the number of excited carriers, such as measuring the current flow between a diode layer and the LASL layer of the data storage unit.

Energy deposited in the adjacent layer may comprise charge carriers generated in response to the beams impinging on the adjacent layer. Alternatively, the energy deposited in the adjacent layer may comprise photons generated in response to the beams impinging on the adjacent layer.

The LASL layer may be closer to the beams than the storage layer. In such case, the LASL layer is likely to be substantially transparent to the electron beams when it is used as a protective layer. In the cathodoluminescent embodiment, the LASL is preferably not transparent, but is used to convert electrons to one or more predetermined wavelengths or range of wavelengths. In the diode embodiment, the adjacent layer may also affect the recombination rate of the electron-hole pairs generated by the read beam. Carrier flow in the LASL may be affected in response to changes in an applied or built-in electric field due to the proximity of a written region in the storage layer.

Other Layers

Since electron beams may be used, it is possible and may be advantageous to cover the storage layer or the adjacent layer with electron transparent or semi-transparent electrodes. For example, uniform top and bottom electrodes will enhance the uniformity of the biasing field formed across diode components of this invention. A back electrode could be present, either on the side of the substrate opposite the optical sources, if a conducting substrate is used, or on top of the substrate, if an electrically isolated substrate is used that provides mechanical support only.

The storage layer may also be covered with a protective layer to prevent chemical changes, such as oxidation or thermo-mechanical changes such as bump or pit formation, during the write mode. The adjacent layer could form a protective layer, as long as it is thin enough to allow writing of small bits. The protective layer may be merely a passivation layer or a conducting electron-transparent electrode that is used to collect the generated carriers in the diode case.

The storage layer may also be covered with a layer that enhances thermal properties of the overall storage medium. For example, if the storage layer is a phase-change material, it may be desirable for it to be in contact with a layer that aids in thermal quenching by acting as a heat sink when changing the state of the materials to an amorphous state. Alternately, or in conjunction with a cover layer, it may be desirable to have a layer underneath the storage layer or adjacent layer that improves thermal properties, such as the ability to quench and amorphize the storage layer. A protective underlayer may also enhance the robustness of the device by preventing interdiffusion between the storage layer and the substrate material, or by discouraging delamination or dewetting of the storage layer from the substrate.

A buffer layer underlying the storage layer may also be used to control the growth mode and improve the film morphology of the storage layer and/or the LASL. The LASL itself may serve as a buffer layer. For example, the buffer layer may force the layers above it to form in a particular crystalline phase or orientation. Control of the crystalline phase and orientation may be important in achieving the desired electrical, optical or thermal properties of the LASL or data storage layer.

Although one layer is shown adjacent the storage layer, it is understood that multiple LASLs may be utilized within the scope of the present invention. Moreover, although the LASL is described as being adjacent to the storage layer, it is understood that such layer may be separated from the storage layer by some other layer, such as those described above, and still be considered to be adjacent to the storage layer within the scope of the present invention.

In other variations of the present invention the LASL may function as one or more of the following: (1) a protective cover for the data storage layer, (2) a diffusion barrier for the data storage layer, (3) a thermal layer for the data storage layer, and/or (4) a growth facilitator of the data storage layer on the LASL.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A data storage unit, comprising:
    a data storage layer having a plurality of data storage areas, wherein each data storage area is configured to carry at least one bit of data;
    an electron beam emitter configured to selectively direct a beam of electrons toward the data storage layer to enable one or more of the data storage areas to be read;
    the data storage layer further configured to filter the beam of electrons directed toward the data storage layer;
    a layer adjacent to the data storage layer (LASL) in which carriers are generated in response to an amount of electrons reaching the LASL; and
    a detection region in carrier communication with the LASL and configured to measure carrier transport in the detection region to determine a state of one or more of the plurality of data storage areas.

2. The data storage unit of claim 1, wherein the data storage layer is comprised of a phase change material.

3. The data storage unit of claim 2, wherein the electron beam emitter is further configured to direct the beam of electrons toward the data storage layer at a power sufficient to enable one or more of the data storage areas to be written by changing the state of the phase change material.

4. The data storage unit of claim 1, wherein each data storage area can be reversibly changed from a crystalline state to an amorphous state by applying heat at a predetermined temperature profile over a pre-selected time.

5. The data storage unit of claim 4, wherein the crystalline state can be obtained by directing the beam of electrons to one of the plurality of data storage areas for a predetermined time at a pre-selected intensity.

6. The data storage unit of claim 4, wherein the amorphous state can be obtained by directing the beam of electrons to one of the plurality of data storage areas for a predetermined time and enabling the data storage area to melt and then cool at a fast, pre-selected rate to enable the data storage area to quench and solidify in an amorphous state.

7. The data storage unit of claim 4, wherein the data storage area can be reversibly changed from the crystalline state to the amorphous state by applying at least a portion of the heat necessary to change the state, wherein the heat is obtained from a source selected from the group consisting of a resistive heater, an applied electric field, an applied magnetic field.

8. The data storage unit of claim 1, wherein the detection region is a diode comprising a diode layer and the LASL.

9. The data storage unit of claim 8, wherein a diode junction is formed between the LASL and the diode layer.

10. The data storage unit of claim 1, wherein the LASL is configured to generate an amplification of carriers excited by the beam of electrons.

11. The data storage unit of claim 1, wherein the LASL is located above the data storage layer.

12. The data storage unit of claim 1, wherein the LASL is located above the data storage layer and the data storage layer is configured to form a portion of the detection region in conjunction with a diode layer.

13. The data storage unit of claim 1, wherein the LASL is located below the data storage layer.

14. The data storage unit of claim 1, further comprising a detector configured to monitor current flow across a diode interface in the detection region to determine the state of each data storage area.

15. The data storage unit of claim 1, further comprising a detector configured to monitor an open circuit cathodo-voltage generated across a diode interface in the detection region to determine the state of each data storage area.

16. The data storage unit of claim 1, wherein the LASL is comprised of one or more cathodoconductive materials for detecting electrons from the data storage layer.

17. The data storage unit of claim 16, wherein the cathodoconductive LASL is located beneath the data storage layer.

18. The data storage unit of claim 1, wherein the LASL is comprised of one or more cathodoluminescent materials that generate photons in response to the beam of electrons.

19. The data storage unit of claim 18, wherein the cathodoluminescent LASL is disposed on top of the data storage layer and converts electrons to photons that are variably absorbed or scattered by in the storage layer depending on a state of each data storage area.

20. The data storage unit of claim 18, wherein the detection region for each data storage area comprises one or more photo-detectors selected from the group consisting of a photodiode, a photoconductor, and a photomultiplier tube.

21. The data storage unit of claim 1, wherein each data storage area has a cell size with a major dimension of less than 250 nanometers.

22. A method for storing data in a data storage unit including a data storage layer having a data storage area, comprising:

providing a layer adjacent to the data storage layer (LASL);

directing an electron beam from an electron beam emitter toward the data storage layer and LASL;

filtering the electron beam directed toward the data storage layer according to a state of each data storage area;

exciting carriers in one or more of the data storage layer and LASL corresponding to a number of electrons filtered in the data storage area; and determining the state of the data storage area based on the number of excited carriers.

23. A method as in claim 22, wherein the state of the storage area can comprise a first state and a second state.

24. A method as in claim 22, wherein the state of the storage area can comprise a plurality of states.

25. A method as in claim 22, wherein the step of determining the state of the data storage area further comprises determining the state of the data storage area based on a secondary electron emission coefficient of the data storage area in one or more of the data storage layer and LASL.

26. A method as in claim 22, wherein the step of determining the state of the data storage area further comprises determining the state of the data storage area based on a backscattered electron coefficient of the data storage area in one or more of the data storage layer and LASL.

27. A system for storing data in a data storage unit including a data storage layer having a data storage area, comprising:

means for providing a layer adjacent to the data storage layer (LASL);

means for directing an electron beam from an electron beam emitter toward the data storage layer and LASL;

means for filtering the electron beam directed toward the data storage layer according to a state of each data storage area;

means for exciting carriers in one or more of the data storage layer and LASL corresponding to a number of electrons filtered in the data storage area; and means for determining the state of the data storage area based on the number of excited carriers.

* * * * *